(12) United States Patent
Markel et al.

(10) Patent No.: US 7,799,876 B2
(45) Date of Patent: Sep. 21, 2010

(54) METHOD AND APPARATUS FOR CONTROLLING STATIC CHARGE IN POLYOLEFIN REACTORS

(75) Inventors: Eric J. Markel, Kingwood, TX (US); Robert O. Hagerty, La Porte, TX (US); F. David Hussein, Cross Lanes, WV (US); Michael E. Muhle, Kingwood, TX (US); Richard B. Pannell, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 541 days.

(21) Appl. No.: 11/827,685

(22) Filed: Jul. 13, 2007

(65) Prior Publication Data

US 2008/0027185 A1    Jan. 31, 2008

Related U.S. Application Data

(60) Provisional application No. 60/834,395, filed on Jul. 31, 2006.

(51) Int. Cl.
 *C08F 2/34* (2006.01)
 *B01J 8/24* (2006.01)

(52) U.S. Cl. ............... 526/60; 526/59; 526/74; 526/901; 422/105

(58) Field of Classification Search ............ 526/59, 526/74, 60, 901; 422/139, 105
See application file for complete search history.

(56) References Cited

U.S. PATENT DOCUMENTS

| | | | |
|---|---|---|---|
| 4,532,311 A | 7/1985 | Fulks et al. | 526/62 |
| 4,803,251 A | 2/1989 | Goode et al. | 526/59 |
| 4,855,370 A | 8/1989 | Chirillo et al. | 526/74 |
| 5,391,657 A | 2/1995 | Song et al. | 526/74 |
| 5,405,922 A | 4/1995 | De Chellis et al. | 526/68 |
| 5,436,304 A | 7/1995 | Griffin et al. | 526/68 |
| 5,648,581 A | 7/1997 | Kubo et al. | 585/501 |
| 6,008,662 A | 12/1999 | Newton et al. | 324/724 |
| 6,548,610 B2 | 4/2003 | Bartilucci et al. | 526/74 |
| 2002/0103072 A1 | 8/2002 | Patrick et al. | 502/117 |
| 2005/0148742 A1* | 7/2005 | Hagerty et al. | 526/68 |

FOREIGN PATENT DOCUMENTS

| | | |
|---|---|---|
| EP | 0811638 | 12/1997 |
| EP | 1106629 | 4/2004 |
| WO | 99/61485 | 12/1999 |
| WO | 2005/068507 | 7/2005 |

* cited by examiner

*Primary Examiner*—Fred M Teskin (57) ABSTRACT

A method for controlling sheeting in a gas phase reactor that includes producing a polyolefin with at least one metallocene catalyst and at least one static control agent in at least one gas phase reactor, measuring entrainment static using a static probe, and adjusting the concentration of the static control agent in response to changes in the measured entrainment static is disclosed.

30 Claims, 4 Drawing Sheets

METHOD AND APPARATUS FOR CONTROLLING STATIC CHARGE IN POLYOLEFIN REACTORS

CROSS REFERENCE TO RELATED APPLICATIONS

This application claims the benefit of Ser. No. 60/834,395, filed Jul. 31, 2006, the disclosure of which is incorporated by reference in its entirety.

FIELD OF THE INVENTION

The invention relates generally to a process for the polymerization of olefins using a static control agent. In particular, the invention relates to a process for measuring and controlling levels of static in a gas phase polymerization process using a metallocene catalyst system.

BACKGROUND

One of the major advances in olefin polymerization technology has been the development of commercially useful metallocene based catalyst systems. Among other advantages, metallocene catalysts allow the production of polyolefins with unique properties such as narrow molecular weight distribution. These properties in turn result in improved structural performance in products made with the polymers such as greater impact strength and clarity in films.

While metallocene catalysts have yielded polymers with improved characteristics, they have presented new challenges when used in traditional polymerization systems. One such area has been in the control of "sheeting" and the related phenomena "drooling" when metallocene catalysts are used in fluidized bed reactors such as those described in U.S. Pat. Nos. 5,436,304 and 5,405,922. "Sheeting" is the adherence of fused catalyst and resin particles to the walls of the reactor. "Drooling" or dome sheeting occurs when sheets of molten polymer form on the reactor walls, usually in the expanded section or "dome" of the reactor, and flow along the walls of the reactor and accumulate at the base of the reactor. Dome sheets are typically formed much higher in the reactor, on the conical section of the dome, or on the hemi-spherical head on the top of the reactor.

Sheeting has been a problem in commercial gas phase polyolefin production reactors for many years. The problem is characterized by the formation of large, solid masses of polymer on the walls of the reactor. These solid masses or polymer (the sheets) eventually become dislodged from the walls and fall into the reaction section, where they interfere with fluidization, block the product discharge port, and usually force a reactor shut-down for cleaning.

Various methods for controlling sheeting have been developed. These often involve monitoring the static charges near the reactor wall in regions where sheeting is known to develop and introducing a static control agent into the reactor when the static levels fall outside a predetermined range. For example, U.S. Pat. Nos. 4,803,251 and 5,391,657 disclose the use of various chemical additives in a fluidized bed reactor to control static charges in the reactor. A positive charge generating additive is used if the static charge is negative, and a negative charge generating additive is used if the static charge is positive. The static charge in the reactor is measured at or near the reactor wall at or below the site where sheet formation usually occurs, using static voltage indicators such as voltage probes or electrodes.

U.S. Pat. Nos. 4,803,251 and 5,391,657 disclose that static plays an important role in the sheeting process with Ziegler-Natta catalysts. When the static charge levels on the catalyst and resin particles exceed certain critical levels, the particles become attached by electrostatic forces to the grounded metal walls of the reactor. If allowed to reside long enough on the wall under a reactive environment, excess temperatures can result in particle fusion and melting, thus producing the sheets or drools.

One of the first descriptions of reactor sheeting was provided in U.S. Pat. No. 4,532,311. The '311 patent also teaches the use of a reactor static probe (the voltage probe) to obtain an indication of the degree of electrification of the fluid bed. U.S. Pat. No. 4,855,370 combined the static probe with addition of water to the reactor (in the amount of 1 to 10 ppm of the ethylene feed) to control the level of static in the reactor. This process has proven effective for Ziegler-Natta catalysts, but has not been effective for metallocene catalysts.

For conventional catalyst systems such as traditional Ziegler-Natta catalysts or chromium-based catalysts, sheet formation usually occurs in the lower part of the fluidized bed. Formation of dome sheets rarely occurs with Ziegler-Natta catalysts. For this reason, the static probes or voltage indicators have traditionally been placed in the lower part on the reactor. For example, in U.S. Pat. No. 5,391,657, the voltage indicator was placed near the reactor distributor plate. See also U.S. Pat. No. 4,855,370. The indicators were also placed close to the reactor wall, normally less than 2 cm from the wall.

U.S. Pat. No. 6,548,610 describes a method of preventing dome sheeting (or "drooling") by measuring the static charge with a Faraday drum and feeding static control agents to the reactor as required to maintain the measured charge within a predetermined range. U.S. Pat. No. 6,548,610 also discloses that conventional static probes, such as those described in U.S. Pat. Nos. 6,008,662, 5,648,581, and 4,532,311. The method of static measurement described in U.S. Pat. No. 6,548,610 (a Faraday drum) is relatively complicated. Other background references include WO 99/61485, WO 2005/068507, EP 0 811 638 A, EP 1 106 629 A, and U.S. Patent Application Publication No. 2002/103072.

As described above, in contrast to the typical wall sheeting observed for Ziegler-Natta catalysts, use of metallocene catalysts can result in either or both wall sheets and dome sheets. While various methods have been developed to manage the sheeting problems with metallocenes, there has been no root-cause solution because the mechanism of sheeting with metallocene catalyst has not been determined.

One of the most difficult aspects of the sheeting problem with metallocene catalysts has been the lack of advanced warning. Most sheeting incidents with metallocenes have occurred with no advanced indication by any of the known process instruments, including the conventional static probes. This lack of indication with conventional instruments has presented a significant challenge in efforts to troubleshoot and correct the sheeting problems encountered when using metallocenes.

Accordingly, there exists a need for an effective method for determining and controlling the static charge in a fluidized bed reactor, especially for use with metallocene catalyst systems.

SUMMARY OF INVENTION

In one aspect, the present invention relates to a method for controlling sheeting in a gas phase reactor that includes producing a polyolefin with at least one metallocene catalyst and at least one static control agent in at least one gas phase reactor, measuring entrainment static using a static probe, and adjusting the concentration of the static control agent in response to changes in the measured entrainment static.

Other aspects and advantages of the invention will be apparent from the following description and the appended claims.

DETAILED DESCRIPTION

In one aspect, embodiments described herein relate to the use of one or more static probes to reduce the occurrence of sheeting in a gas phase reactor. In other aspects, embodiments described herein relate to a method for reducing the occurrence of sheeting by measuring a static charge in the fluidized bed of a gas phase reactor, and adjusting the concentration of a static control agent in the reactor in response to the measured charge.

Sheeting in gas phase polyolefin reactors may be reduced or eliminated through a process involving measurement and control of static, the electrical charge that accumulates on the resin particles in the fluidized bed, the reactor, and the recycle system. Much of this static charge may be formed when catalyst and fine resin particles are entrained from the fluid bed and conveyed at relatively high speed through the reactor recycle system. In some embodiments, control of sheeting may be accomplished by forcing this static to positive values by addition of static control agents.

Static Probes: Measurement of Static

Figure 1:
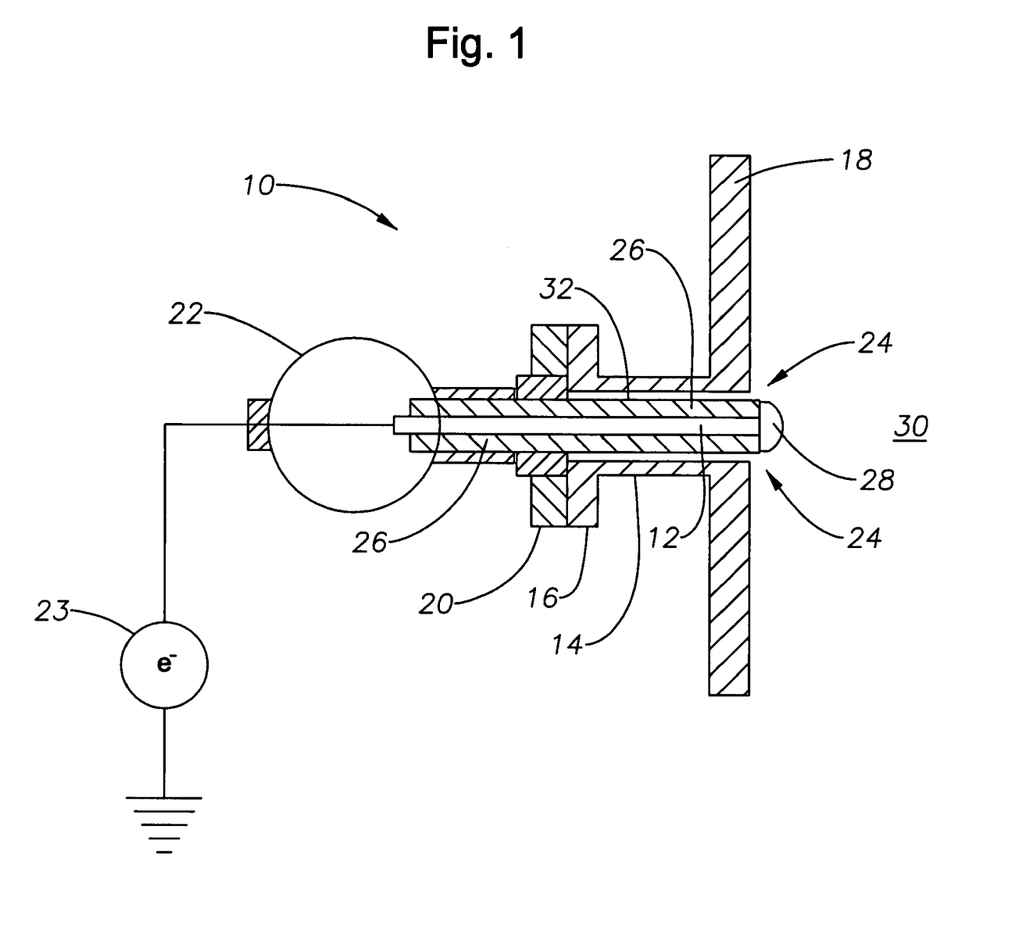
FIG. 1 is a schematic diagram of one embodiment of a reactor static probe.

FIG. 1 shows a schematic representation of one embodiment of a static probe 10 useful for measuring reactor static as described herein. Probe element 12 is provided within a metal (e.g., carbon steel or stainless steel) housing 14. The metal housing 14 together with a flange 16 may have a user-specified length, L. The flange 16, housing 14, and the reactor wall 18 may be at ground potential. Flange 16 mates via another flange 20 with an electronics enclosure 22 within which is a circuit for measuring reactor static. The circuit may measure current or voltage, as the two circuits are essentially equivalent, as described in U.S. Pat. No. 6,008,662, and described above. The circuit may relay the current or voltage to meter 23, which may be a current meter or a volt meter, depending upon the circuit employed.

Housing 14 fits into an opening 24 in the reactor wall 18 and allows an insulator 26 and an inner probe piece 28 of the probe element 12 to protrude into the reaction chamber 30. Around the insulator 26 may be an outer probe sheath 32 made of a metallic material such as carbon steel or stainless steel. For example, inner probe piece 28 may be a solid metal rod, insulator 26 may be a tubular sleeve around the piece 28, and the outer sheath 32 may be another tubular sleeve around the insulator 26. The sheath 32, like reactor wall 18 and housing 14, may be at ground potential.

As illustrated, static probe 10 is a flange-mounted instrument. In other embodiments, static probe 10 may be screw-mounted or attached to the reactor using other means common in the industry.

The static probe 10 may measure the very low levels of electric current that flows from a probe tip 28 as a result of particles impacting the probe tip 28, where the particles may be catalyst or resin particles. The measured current from the probe tip 28 provides an estimate of the charge transfer that is occurring on the reactor wall 18 as a whole. In addition, the image charge of passing particles may also be registered by the probe 10. This results in an alternating sign of the signal as the particle approaches and leaves the probe. The image charge is also indicative of the charge in the reactor bed.

The probe tip 28 may effectively represent a piece of the reactor wall 18 that has been instrumented to measure the charge flow. The probe tip 28 may be fabricated from a material similar to that of the reactor wall 18. For example, carbon steel may be used as a probe tip 28 to measure the charge flow from a carbon steel reactor wall 18. Typical current levels measured with the reactor probe may range from 0.1 to 10 nanoamps in some embodiments.

The levels of static charge in the reactor may be measured at various locations in a reactor. For example, the level of static charge in the reactor may be measured using a static probe inserted into the lower section of the fluidized bed, such as a short distance above the distributor plate, for example. This lower bed probe may provide a measurement of bed static, the level of static within the fluidized bed. Measurement of bed static may be effective for controlling wall sheeting.

The levels of static in the reactor may also be measured using a static probe located near the top of the fluidized bed, such as a short distance below the top of the fluidized bed, for example. This upper static probe may provide a measurement of entrainment static, the static at or near the top of the fluidized bed or near the reactor output streams, which may result from frictional contact between entrained catalyst and resin fines against the walls and other metal components in the reactor recycle system. Measurement of entrainment static may provide signals that are more representative of the average bed and may be more responsive to static control agents. Similarly, the level of static may be measured in a disengagement zone of the reactor, near an outlet stream of the reactor, within a reactor recycle stream, or other various locations in the reactor or reactor system.

In other embodiments, the level of static may be measured in both the upper and lower sections of the reactor. In this manner, the concentration of static control agent within the reactor may be controlled in response to changes in the measurement provided by either or both static probes. For example, the measured values for the entrainment static and bed static may be used as inputs to a digital control system (DCS), where an output from the DCS used to control static control agent concentration may be based upon a function using one or both inputs.

In other embodiments, such as in a staged reactor system or a reactor system employing two or more reactors as described below, the level of static may be measured in only a single reactor, or may be measured in both reactors. For example, in a staged reactor system where one reactor produces a high molecular weight polymer component and another reactor produces a low molecular weight component, control of static levels in the reactors may be effected by measuring static charge levels in the reactor producing the high molecular weight component as higher molecular weight components may result in higher static levels.

Static Control Agents

As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst being used. For example, the use of static control agents is disclosed in European Pat. No. 0229368 and U.S. Pat. No. 5,283,278 and references cited therein.

For example, if the static charge is negative, then static control agents such as positive charge generating compounds may be used. Positive charge generating compounds may include MgO, ZnO, $Al_2O_3$, and CuO, for example. In addition, alcohols, oxygen, and nitric oxide may also be used to control negative static charges. See, for example, U.S. Pat. Nos. 4,803,251 and 4,555,370.

For positive static charges, negative charge generating inorganic chemicals such as $V_2O_5$, $SiO_2$, $TiO_2$, and $Fe_2O_3$ may be used. In addition, water or ketones containing up to 7 carbon atoms may be used to reduce a positive charge.

In a class of embodiments, when catalysts such as, for example, metallocene catalysts are used in the fluidized bed polymerization process, control agents such as aluminum stearate may also be employed. The static control agent used may be selected for its ability to receive the static charge in the fluidized bed without adversely affecting productivity. Suitable static control agents may also include aluminum distearate, ethoxylated amines, and anti-static compositions such as those provided by Innospec Inc, under the trade name OCTASTAT 2000, a mixture of a polysulfone copolymer, polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., Carboxylate Metal Salt+with any family member belonging to the KEMAMINE™ or ATMER™ family of products).

The above are merely illustrations of static control agents useful in the practice of the invention. Other static control agents useful in the practice of the invention are well known to those in the art. Regardless of which agent is used, care should be exercised in selecting an appropriate static control agent to avoid introduction of poisons into the reactor. In addition, in selected embodiments, the smallest amount of the agent necessary to bring the static charge into alignment with the desired range should be used.

In some embodiments, the static control agent added to the reactor may be a combination of two or more of the above listed static control agents. In other embodiments, the static control agent(s) may be added to the reactor in the form of a solution or a slurry, and may be added to the reactor as an individual feed stream or may be combined with other feeds prior to addition to the reactor. For example, the static control agent may be combined with the catalyst or catalyst slurry prior to feeding the combined catalyst-static control agent mixture to the reactor.

In some embodiments, the static control agent may be added to the reactor in an amount ranging from 0.05 to 200 ppm, based on the weight of all feeds to the reactor, excluding recycle. In other embodiments, the static control agent may be added to the reactor in an amount ranging from 2 to 100 ppm; and from 4 to 50 ppm in yet other embodiments. In other embodiments, the static control agent may be added to the reactor in an amount of 4 ppm or greater, based on the weight of all feeds to the reactor, excluding recycle.

In some embodiments, the static control agent may be added to the reactor at a feed rate ranging from 0.05 to 10 kg/h. In other embodiments, the static control agent may be added to the reactor at a feed rate ranging from 0.1 to 5 kg/h; and from 0.2 to 2 kg/h in yet other embodiments. In other embodiments, the static control agent may be added to the reactor at a feed rate of 0.2 kg/h or greater.

Control of Static Levels

The bed static measurements, entrainment static measurements, or the combined measurement of bed and entrainment static may provide a definitive signal that may be used to control the amount of static and the charge of the static in the reactor bed. The control of static, measured as described above, may be accomplished by addition of static control agents to the reactor, or by adjusting the concentration of static control agents in the reactor relative to the amount of particles in the reactor. In some embodiments, for example, the concentration of static control agents in the reactor may be adjusted by increasing or decreasing the feed rate of a static control agent to the reactor. By controlling levels of static, it may be possible to minimize the occurrence of bed or dome sheeting.

In other embodiments, for example, process operating conditions may be varied to increase or decrease the amount of solids or particles in the reactor, thereby resulting in a change in the concentration of static control agent in the reactor. Operating conditions that may be varied include the feed rates of monomer, comonomer, catalyst, or hydrogen, reactor temperature and pressure, recycle flow rates, and other variables commonly used to influence reactor solids concentration.

Polymerization Process

Embodiments for producing polyolefin polymer disclosed herein employ a gas phase polymerization process utilizing a fluidized bed reactor. This type reactor, and means for operating the reactor, are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent. As described above, the method and manner for measuring and controlling static charge levels may depend upon the type of reactor system employed.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In general, the polymerization process of the present invention may be a continuous gas phase process, such as a fluid bed process. A fluid bed reactor for use in the process of the present invention typically has a reaction zone and a so-called velocity reduction zone (disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The process of the present invention is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment; ethylene and a comonomer comprising from 3 to 12 carbon atoms in another embodiment; ethylene and a comonomer comprising from 4 to 10 carbon atoms in another embodiment; and ethylene and a comonomer comprising from 4 to 8 carbon atoms in another embodiment.

In embodiments, polyethylenes may be prepared by the process of the present invention. Such polyethylenes may include homopolymers of ethylene and interpolymers of ethylene and at least one alpha-olefin wherein the ethylene content is at least about 50% by weight of the total monomers involved. Olefins that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

Other monomers useful in the process described herein include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene. In another embodiment of the process described herein, ethylene or propylene may be polymerized with at least two different comonomers, optionally one of which may be a diene, to form a terpolymer.

In one embodiment, the content of the alpha-olefin incorporated into the copolymer may be no greater than 30 mol % in total; from 3 to 20 mol % in other embodiments. The term "polyethylene" when used herein is used generically to refer to any or all of the polymers comprising ethylene described above.

Hydrogen gas is often used in olefin polymerization to control the final properties of the polyolefin. Using the catalyst system of the present invention, it is known that increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of the present invention is an amount necessary to achieve the desired MFI or MI of the final polyolefin resin.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. Such commercial polymerization systems are described in, for example, 2 METALLOCENE-BASED POLYOLEFINS 366-378 (John Scheirs & W. Kaminsky, eds. John Wiley & Sons, Ltd. 2000); U.S. Pat. No. 5,665,818, U.S. Pat. No. 5,677,375, and EP-A-0 794 200.

In one embodiment, the one or more reactors in a gas phase or fluidized bed polymerization process may have a pressure ranging from about 0.7 to about 70 bar (about 10 to 1000 psia); and in another embodiment a pressure ranging from about 14 to about 42 bar (about 200 to about 600 psia). In one embodiment, the one or more reactors may have a temperature ranging from about 10° C. to about 150° C.; and in another embodiment from about 40° C. to about 125° C. In one embodiment, the reactor temperature may be operated at the highest feasible temperature taking into account the sintering temperature of the polymer within the reactor. In one embodiment, the superficial gas velocity in the one or more reactors may range from about 0.2 to 1.1 meters/second (0.7 to 3.5 feet/second); and from about 0.3 to 0.8 meters/second (1.0 to 2.7 feet/second) in another embodiment.

In one embodiment of the invention, the polymerization process is a continuous gas phase process that includes the steps of: (a) introducing a recycle stream (including ethylene and alpha olefin monomers) into the reactor; (b) introducing the supported catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In embodiments of the invention, one or more olefins, $C_2$ to $C_{30}$ olefins or alpha-olefins, including ethylene or propylene or combinations thereof, may be prepolymerized in the presence of the metallocene catalyst systems described above prior to the main polymerization. The prepolymerization may be carried out batch-wise or continuously in gas, solution or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and WO 97/44371 all of which are herein fully incorporated by reference.

The present invention is not limited to any specific type of fluidized or gas phase polymerization reaction and can be carried out in a single reactor or multiple reactors such as two or more reactors in series. In embodiments, the present invention may be carried out in fluidized bed polymerizations (that may be mechanically stirred and/or gas fluidized), or with those utilizing a gas phase, similar to that as described above. In addition to well-known conventional gas phase polymerization processes, it is within the scope of the present invention that "condensing mode", including the "induced condensing mode" and "liquid monomer" operation of a gas phase polymerization may be used.

Embodiments of the present invention may employ a condensing mode polymerization, such as those disclosed in U.S. Pat. Nos. 4,543,399; 4,588,790; 4,994,534; 5,352,749; 5,462,999; and 6,489,408, each of which is hereby incorporated by reference. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304, which is hereby incorporated by reference.

Other embodiments of the preset invention may also use a liquid monomer polymerization mode such as those disclosed in U.S. Pat. No. 5,453,471; U.S. Pat. No. 5,834,571; PCT 95/09826 (US) and PCT 95/09827 (US). When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

In one embodiment of the process of the invention, the gas phase process may be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc, and the like. By "essentially free," it is meant that these compounds are not deliberately added to the reactor or any reactor components, and if present, are present in the reactor at less than 1 ppm.

More specific embodiments of the static control systems will be illustrated by the examples below.

EXAMPLES

A static control agent (dry aluminum distearate, available from Chemtura Corporation) was physically blended with the metallocene catalyst system of bis-(n-butyl cylopentadienyl) zirconium dichloride metallocene and methyl alumoxane cocatalyst, available from Univation Technologies, Houston, Tex., at a 2.9 weight percent loading. The mixture of catalyst and static control agent was fed to a reactor using two Mark V dry catalyst feeders, each equipped with two transfer lines to the reactor (4 transfer lines total). Some data was also collected during operations using catalyst with 1.5 weight percent static control agent, although this represents a minority of the data. Static control agent feed rates were reported both as pounds-per-hour and parts-per-million (weight basis) of reactor feed.

Readings from two static probes placed on a reactor were measured in the form of an electrical current. One static probe measured bed static and the other measured entrainment static, as the probes were independently placed in the lower section of the fluidized bed and near the top of the bed, respectively. A high-speed data collection system computed and stored average values, standard deviations, and root mean square values of the raw static signals. Reactor static data collected over a six month period was then analyzed.

Figure 2:
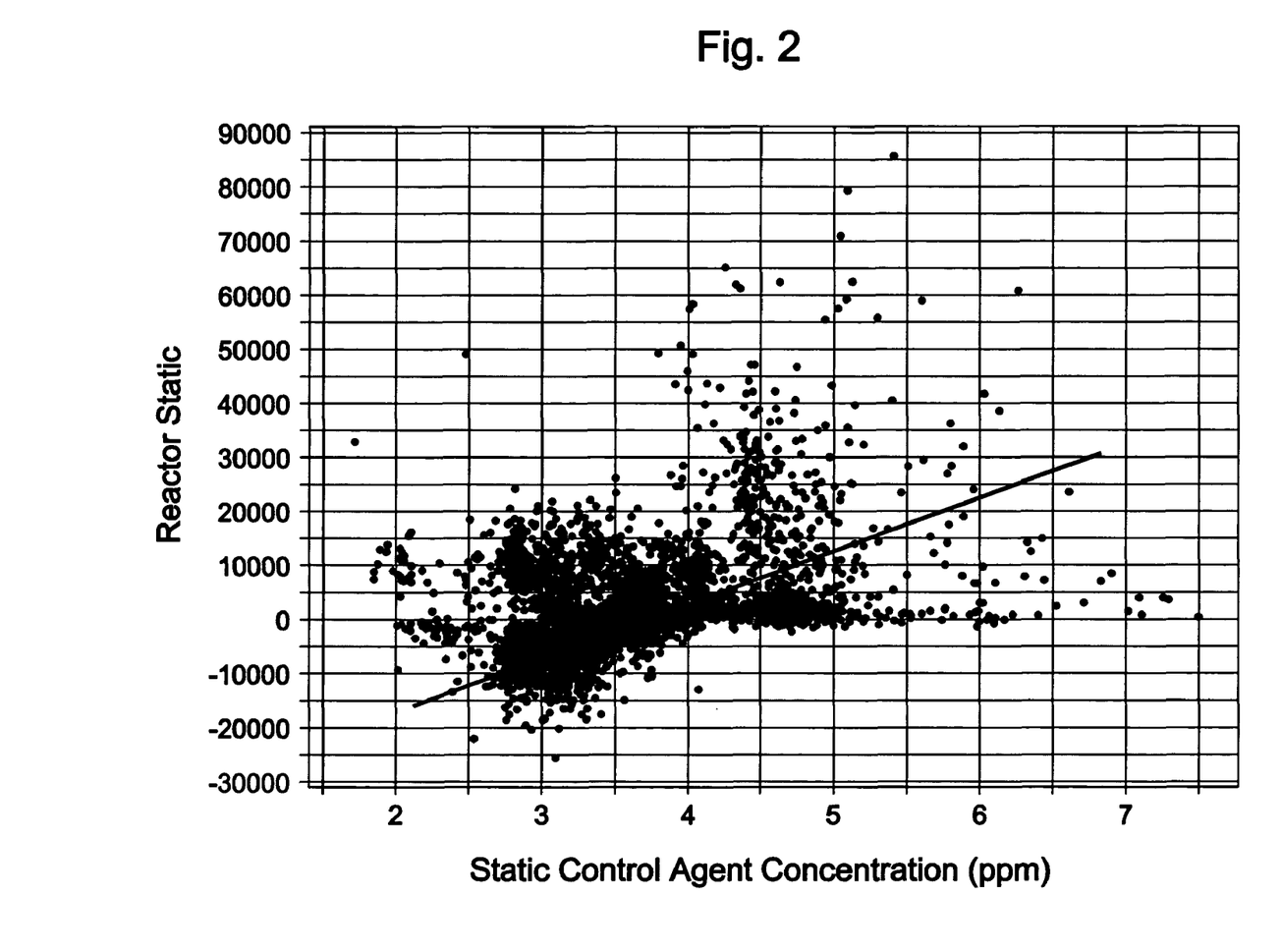
FIG. 2 presents experimental results measuring reactor static levels as a function of static control agent concentration.
Figure 3:
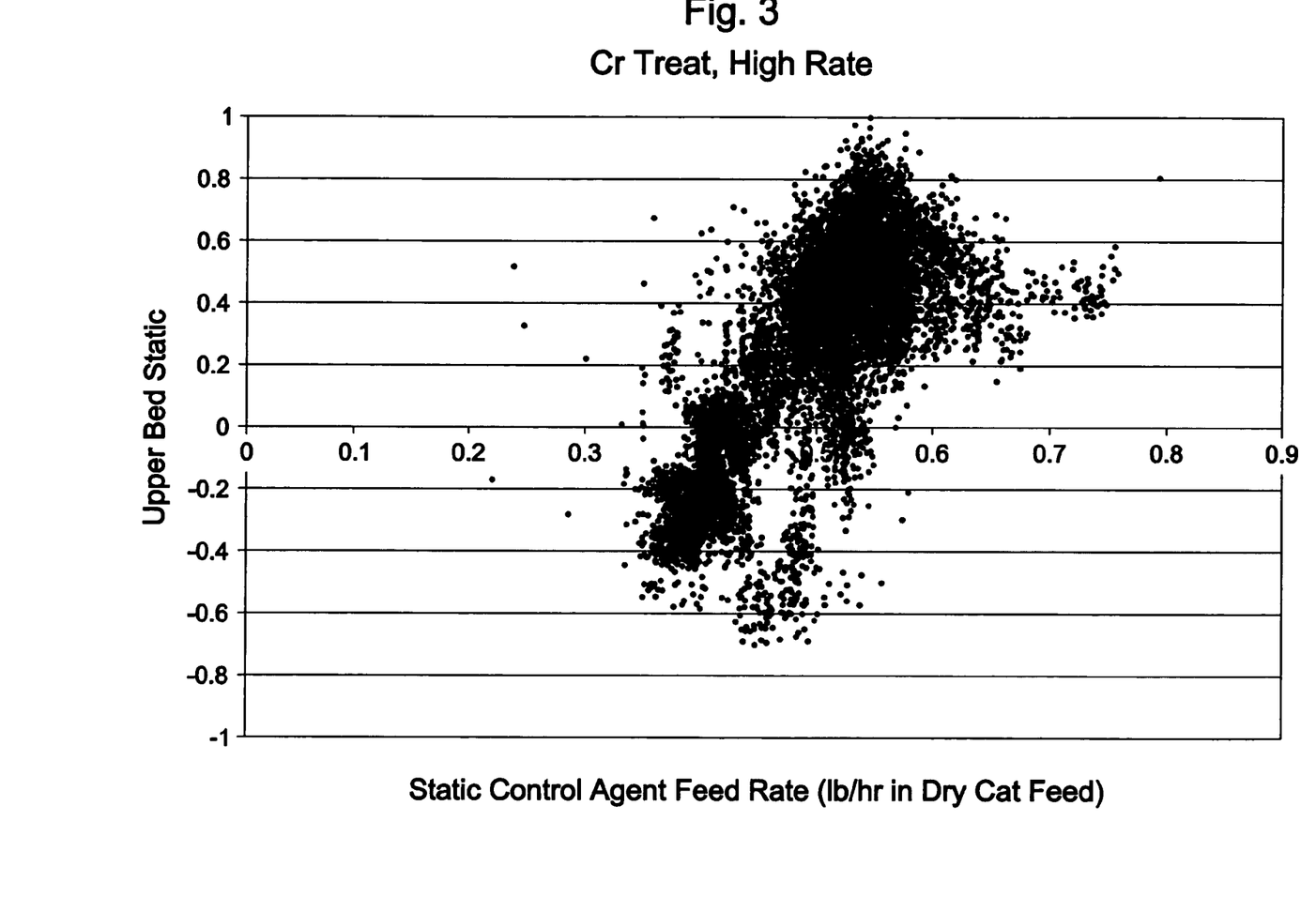
FIG. 3 presents experimental results measuring reactor static levels as a function of static control agent feed rate.

The static data indicated that the most significant independent control variable influencing reactor static was static control agent (aluminum distearate) feed rate. This is illustrated in FIGS. 2 and 3, in which higher levels of static control agent were linked to the desired positive static levels. The bed concentration, in ppm, was also shown to correlate, but to a lesser extent than the static control agent feed rate. Static control agent feed rate (ppm or mass flow) was also found to influence other static probes in the reactor and cycle gas, but the upper bed static probes provided the best statistical linkage.

Two types of sheeting of commercial concern are wall sheeting and dome sheeting. Wall sheeting during metallocene catalyst system operations may be linked to negative static in the lower section of the reactor. The data illustrated in FIGS. 2 and 3 provided an important and previously unknown result: static in the lower section of the reactor may be driven to positive values by maintaining static control agent, in this case aluminum distearate, levels at 4 ppm or greater (on a feed weight basis).

Similarly, it has been shown that dome sheeting, particularly on startup, may be linked to excessive carryover of resin/fines/catalyst out of the bed, into the dome and recycle system. This carryover may be substantially controlled by upper bed static. When the upper bed static is negative, resin/fines/catalyst are retained and accumulated on the reactor walls. The accumulation at the wall of material containing high levels of catalyst may result in the formation of sheets, especially dome sheets. The data shown in FIGS. 2 and 3 indicates that the upper bed static is driven to positive values by maintaining the aluminum distearate feed rate at 0.5 lb/hr or greater.

The data provided pertain to the specific case of operations in one reactor with a specific metallocene catalyst. Other reactors, of different sizes, operating at different rates, with different catalysts, raw materials, and resin grades, may require different levels or different types of static control agent. Those having ordinary skill in the art will appreciate that the amounts of static control agents may be determined without undue experimentation.

Sheeting with metallocene catalysts may also be correlated to measurements of entrainment static in the reactor recycle line and the distributor plate. These results provide strong evidence that the root-cause mechanism for sheeting with metallocene may be similar to that for Ziegler-Natta catalysts, namely static electrification. However, sheeting with metallocene catalysts may differ from that for Ziegler-Natta catalysts; for metallocenes, the static charging may occur in the recycle line or by charge segregation due to bi-polar charging in the bed.

Without being bound by any particular theory, these results suggest that sheeting with metallocene derives primarily from static electrification of catalyst and/or resin fines that occur as entrained particles are conveyed through the recycle system and/or bi-polar charging, measured as the entrainment static. Based on these findings, a mechanistic model of sheeting with metallocene catalysts has been postulated. The model proposes a three-stage mechanism for sheeting with metallocene catalysts: (1) static charging of entrained catalyst fines in the recycle system and/or bi-polar charging, (2) attachment of the catalyst fines to the walls of the reactor where stagnation zones exist, and (3) overheating of the catalyst particles on the wall as a result of the collective heating of a large number of catalyst particles. The model appears to be consistent with previous observations of sheeting in pilot plant and commercial reactors.

Figure 4:
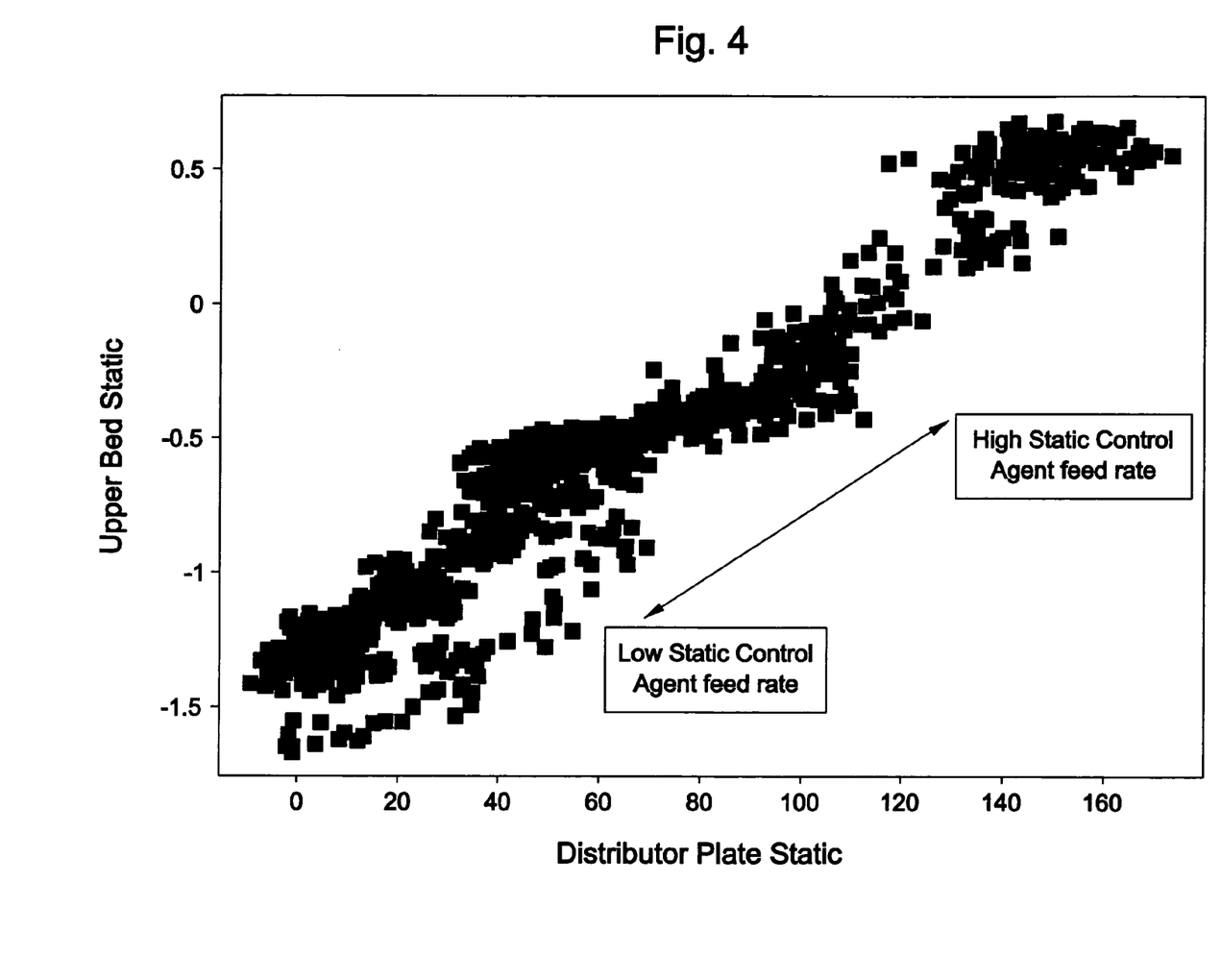
FIG. 4 presents experimental results measuring upper reactor bed and distributor plate static levels as a function of static control agent feed rate.

Accordingly, the data indicates that metallocene PE develops negative charge when in motion in an operating environment and the static control agent, such as aluminum distearate develops a positive charge. Addition of aluminum distearate in sufficient concentration or quantities to the reactor shifted the net balance of charge in the reactor towards the desired positive values, as illustrated in FIG. 4. Higher levels of static control agent drove the static further in the positive direction. Other factors such as impurities have also been shown to also impact static levels. By modulating the aluminum distearate feed rate to the reactor, it was possible to compensate for these other factors, maintaining or driving static to the desired positive range.

Advantageously, the present invention provides a method for controlling or minimizing the occurrence of dome and wall sheeting when metallocene catalyst systems are used in a gas phase polymerization reactor. The static level within the reactor may be measured in one or more locations (upper bed and lower bed or equivalents), and these measurements may be used in combination with static control agent feed controllers to maintain the bed static within a predetermined range.

Embodiments disclosed herein advantageously provide a means for more reliable operation of metallocene catalysts, which have been prone to sheeting in fluid bed reactors. The invention may also be useful with other catalysts systems as well.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed:

1. A method for controlling sheeting in a gas phase reactor, the method comprising:
   producing a polyolefin with at least one metallocene catalyst and at least one static control agent in at least one gas phase reactor,
   measuring entrainment static using a static probe; and
   adjusting the concentration of the static control agent in response to changes in the measured entrainment static, wherein adjusting the concentration of the static control agent drives the measured entrainment static in a positive direction to maintain positive values for the measured entrainment static.

2. The method of claim 1, wherein the adjusting the concentration of the static control agent comprises adjusting a feed rate of the static control agent to the reactor.

3. The method of claim 1, wherein the adjusting the concentration of the static control agent comprises adjusting a concentration of the static control agent in a catalyst feed stream.

4. The method of claim 1, wherein the adjusting a concentration of the static control agent comprises adjusting at least one reactor operating condition affecting reactor solids content.

5. The method of claim 4, wherein the reactor operating condition is selected from the group consisting of monomer feed rate, comonomer feed rate, catalyst feed rate, hydrogen feed rate, reactor temperature, reactor pressure, and combinations thereof.

6. The method of claim 1, wherein the static probe is located proximate a top of a fluidized bed in the gas phase reactor.

7. The method of claim 1, wherein the static probe is located above a top of a fluidized bed in the gas phase reactor.

8. The method of claim 1, wherein the static probe is located in a disengagement zone of the reactor, near a recycle outlet, or in a recycle line.

9. The method of claim 2, wherein the feed rate of the static control agent is 0.2 kg/h or greater.

10. The method of claim 1, wherein the concentration of static control agent in the reactor is 4 ppm on a weight basis or greater.

11. A method for controlling sheeting in a gas phase reactor, the method comprising:
    producing a polyolefin with at least one metallocene catalyst and at least one static control agent in a gas phase reactor;
    measuring bed static using a first static probe;
    measuring entrainment static using a second static probe; and
    adjusting a concentration of the static control agent in response to changes in at least one of the measured entrainment static or the measured bed static, wherein adjusting the concentration of the static control agent drives the measured bed static in a positive direction to maintain positive values for the measured bed static.

12. The method of claim 11, wherein the first static probe comprises a probe tip proximate a reactor wall adjacent a lower section of a fluidized bed within the gas phase reactor.

13. The method of claim 12, wherein the reactor wall and the probe tip comprise metals having similar conductive properties.

14. The method of claim 13, wherein the tip of the first static probe and the reactor wall comprise carbon steel.

15. The method of claim 11, wherein the second static probe comprises a probe tip proximate a reactor wall adjacent a top of a fluidized bed within the gas phase reactor.

16. The method of claim 15, wherein the reactor wall and the second static probe tip comprise metals having similar conductive properties.

17. The method of claim 16, wherein the tip of the second static probe and the reactor wall comprise carbon steel.

18. The method of claim 11, wherein the adjusting a concentration of the static control agent comprises adjusting a feed rate of the static control agent to the reactor.

19. The method of claim 11, wherein the adjusting a concentration of the static control agent comprises adjusting a concentration of the static control agent in a catalyst feed stream.

20. The method of claim 11, wherein the adjusting a concentration of the static control agent comprises adjusting at least one reactor operating condition affecting reactor solids content.

21. The method of claim 20, wherein the reactor operating condition is selected from the group consisting of monomer feed rate, comonomer feed rate, catalyst feed rate, hydrogen feed rate, reactor temperature, reactor pressure, and combinations thereof.

22. The method of claim 11, wherein the feed rate of static control agent is 0.2 kg/h or greater.

23. The method of claim 11, wherein a concentration of the static control agent is 4 ppm on a weight basis or greater.

24. The method of claim 11, wherein the second static probe is located above a top of a fluidized bed in the gas phase reactor.

25. The method of claim 11, wherein the second static probe is located in a disengagement zone of the reactor, near a recycle outlet, or in a recycle line.

26. The method of claim 1, wherein the static control agent is positive charge generating.

27. The method of claim 1, further comprising adjusting the concentration of the static control agent in response to changes in the measured entrainment static, wherein adjusting the concentration of the static control agent drives the measured entrainment static from a negative value to a positive value.

28. The method of claim 11, wherein the static control agent is positive charge generating.

29. The method of claim 11, further comprising adjusting the concentration of the static control agent in response to changes in at least one of the measured entrainment static or the measured bed static, wherein the adjusting the concentration of the static control agent drives the measured bed static from a negative value to a positive value.

30. The method of claim 11, further comprising adjusting the concentration of the static control agent in response to changes in at least one of the measured entrainment static or the measured bed static, wherein the adjusting the concentration of the static control agent drives the measured entrainment static from a negative value to a positive value.

* * * * *